(12) United States Patent
Devine et al.

(10) Patent No.: US 7,450,614 B2
(45) Date of Patent: *Nov. 11, 2008

(54) COMMUNICATIONS SWITCHING ARCHITECTURE

(75) Inventors: Geoffrey Devine, Portsmouth, NH (US); Patrick Quigley, Hampstead, NH (US); Jeffrey J. Fitzgerald, Amherst, NH (US); Daniel W. English, Salem, NH (US); John Doucette, Londonderry, NH (US); Paul Miller, Derry, NH (US)

(73) Assignee: Cedar Point Communications, Derry, NH (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/410,848

(22) Filed: Apr. 24, 2006

(65) Prior Publication Data

US 2006/0187957 A1 Aug. 24, 2006

Related U.S. Application Data

(63) Continuation of application No. 10/428,593, filed on May 2, 2003, now Pat. No. 7,035,289.

(60) Provisional application No. 60/377,680, filed on May 3, 2002.

(51) Int. Cl.
*H04J 1/02* (2006.01)
*H04J 3/02* (2006.01)
*H04L 12/50* (2006.01)

(52) U.S. Cl. ............... 370/493; 370/353; 370/360; 370/442; 370/466; 370/476

(58) Field of Classification Search ............. 370/353, 370/360, 466, 476, 493, 442
See application file for complete search history.

(56) References Cited

U.S. PATENT DOCUMENTS

| 4,603,416 | A | 7/1986 | Servel et al. |
| 6,091,725 | A | 7/2000 | Cheriton et al. |
| 6,570,890 | B1 | 5/2003 | Keenan et al. |
| 7,035,289 | B2 * | 4/2006 | Devine et al. ............ 370/493 |

FOREIGN PATENT DOCUMENTS

| EP | 0312 628 | 4/1989 |
| EP | 1014 749 A2 | 6/2000 |
| EP | 1041-854 A2 | 10/2000 |

* cited by examiner

*Primary Examiner*—Afsar M. Qureshi
(74) *Attorney, Agent, or Firm*—Ropes & Gray LLP

(57) ABSTRACT

Presently described is a system and method for switching multimedia data communications, including but not limited to Voice over IP (VoIP) telephony, cable TV, digital audio and video. The system utilizes a single, integrated device to provide all Packet Cable-compliant functionality, including enhanced user privacy, compliance with CALEA, E911 and other mandated services not available in conventional distributed Packet Cable systems. High speed and efficient, low cost operation are provided by means of an optimized data unit encapsulation scheme for internal switching and routing. A proprietary fiber optic backplane and removable optical connectors are used to enable light speed internal communications hot-swapping of components. Furthermore, the present system is extensible to all forms of digital data switching and is secure, resistant to Denial of Service attacks, and fault-resilient.

16 Claims, 4 Drawing Sheets

Ingress Flow

Egress Flow

COMMUNICATIONS SWITCHING ARCHITECTURE

CROSS-REFERENCE TO RELATED APPLICATIONS

This application is a continuation of U.S. patent application Ser. No. 10/428,593 filed on May 2, 2003, which claims priority to Provisional application Ser. No. 60/377,680, filed on May 3, 2002. The contents of all of the above applications are hereby incorporated herein by reference in their entirety.

BACKGROUND OF THE INVENTION

1. Field of the Invention

This invention relates to data communications and in particular to communications switching architectures and features.

2. Description of the Related Art

Cable television operators have typically been faced with telecommunications service solutions and architectures that were developed for other industries, classes of providers, scales, and physical plants. To date, two methods of providing voice services in the multimedia-rich cable industry have been proposed and are being tested: circuit switching and distributed telephony systems. Neither is well-suited to the need to carry a wide range of multimedia (video, audio, text, graphic, wideband, and narrowband) traffic over the limited geographic scale of the typical cable television outside plant, including but not limited to the types of hybrid fiber/coaxial cable (HFC) plants seen in the field today.

Circuit switching systems have been the standard switching means for primary voice quality and reliability in public telephony networks for many years. In such a system, circuit traffic is defined as having a pre-provisioned connection through a network. In particular, TDM-based circuit traffic is defined as having reserved bandwidth through the network, and more specifically, specific time slots through the network reserved to carry the traffic for that circuit whether or not any valid traffic is available to be sent. Certain standard TDM circuit formats have been defined such as DS0, DS1, and E1. Traditional methods for connecting TDM circuits together to complete a connection employ the use of a TDM-based switch. There are various architectures and ways to construct such a switch known in the art, but a general characteristic of such a switch is that once a connection is setup, there is no competition for switching resources, so a fixed latency through the switch is guaranteed. These switches cannot handle packet traffic.

In a distributed telephony system, such as that proposed by Cable Labs and others in the PacketCable™ initiative (see below), telephony data is converted to packets and switched in a managed Internet Protocol (IP) environment, using a variety of IP and network protocols. The switch used in these types of systems, and for IP traffic in general, is typically referred to as a packet switch.

A packet switch is designed to handle packet traffic, which has different characteristics from circuit traffic. In particular, most packet systems are designed as connectionless, meaning they do not pre-provision a connection through the network, nor do they reserve bandwidth to carry the traffic. Some packet systems (for example, Asynchronous Transfer Mode [ATM] systems) do use connection-oriented protocols and some IP protocols (e.g., Multi-protocol Packet Label Switching [MPLS]) also provide a certain level of bandwidth reservation. However, these systems add extra complexity and potential compatibility issues.

In a packet switch, headers are attached to each individual packet to indicate the destination of the packet. The packets are switched in real-time to the correct output at each packet switch along the path. As a result, traffic arriving at a packet switch is non-deterministic and has to compete for switching resources as it tries to get through the switch. The resulting effect is that the packets are subject to a non-deterministic latency through the switch.

An additional characteristic of a packet switch is that it must be designed to handle different size packets. This is a result of the various protocols that are used in packet networks.

Typically, packets that are larger than the fixed size data units (FSDU) are chopped into smaller pieces (i.e., fragmented or segmented). Packets that are smaller than the FSDU are padded to make a full FSDU. The size of the FSDU is arbitrary, although it is generally optimized to be efficient for the range of packet sizes expected in the application for which it is designed. An FSDU for a typical packet switch is between 64 bytes and 256 bytes.

As networks merge in the current telecommunication world, systems are being designed to accommodate both TDM circuit traffic and packet traffic simultaneously. The most cost-efficient implementation of such a system uses a single switch fabric to accommodate both pure data packet and packetized voice (e.g., VoIP) traffic. Such a system needs to consider the various requirements of these two inherently different types of traffic.

Voice over Internet Protocol (VoIP) networks 100 use the architectural framework shown in FIG. 1 to route packetized voice conversations via the Real Time Protocol (RTP) described in Internet Engineering Task Force (IETF) Request for Comments (RFC) 1889 between endpoints or Multimedia Terminal Adapters (MTAs) 101. MTAs convert voice into RTP packets 105 in one direction and RTP packets into voice in the other direction. A Public Switched Telephone Network 150 (PSTN) Gateway 110 is used when the call's destination is to a telephone 115 located on the PSTN. A Call Management Server (CMS) 120 uses an industry-standard signaling (SIG) protocol 125 such as H.323, SIP, MGCP, or MEGACO to set up the RTP flow between these endpoints. This traditional VoIP network architectural framework optimizes the use of network bandwidth but is inadequate for carrier class telephony where user privacy, operator busy line verification and break in, and the Communications Assistance for Law Enforcement Act (CALEA) are required.

MTAs have telephone functions built in or provide an RJ-11 or other industry-standard interface to a standard telephone set connection 130. In either case, MTAs are provided as Customer Premises Equipment (CPE) located within a subscriber's residence or business. A MTA can therefore be tampered with or replaced with non-standard equipment capable of monitoring IP traffic the network and providing proprietary information to an unauthorized user. With this information a malicious user could originate network signaling and/or control packets that could interrupt or deny service to other users on the network. Such disruptions (sometimes referred to in the data communications arts as a "Denial of Service" or DoS Attack) are unacceptable when a VoIP network is used for primary line telephone service. Furthermore, since the IP address of a subscriber's MTA is the routing equivalent of their phone number, regulations that require the subscriber's ability to block the well-known Caller ID service/function could be interpreted to also require blocking of their IP address in a VoIP deployment. Theft of services is also a recognized risk to be avoided. Protection of CPE and CPE-based functionality must also take into account the need for content and service security.

In addition, the Communications Assistance for Law Enforcement Act (CALEA) requires that a service provider support lawful surveillance of traffic in the network unobtrusively delivering the call identifying information and/or its content. With the traditional VoIP architectural framework described above, CALEA is very complex and may require the coordination of multiple network elements. (Such an alternative is described in, for example, the PacketCable Electronic Surveillance Specification PKT-SP-ESP-i01-991229, which is incorporated herein by reference in its entirety.) Other architectural features, requirements, and industry standards relating to providing VoIP and other secure media services over the cable television network infrastructure can be found in the various Packet Cable specifications and reports provided at specifications. ECNs are posted to the PacketCable LiveLink site (see the hyperlink above).

PacketCable 1.0

The eleven specifications and six technical reports in the following table define PacketCable 1.0. Together these documents define the call signaling, Quality of Service (QoS), CODEC, client provisioning, billing event message collection, PSTN (Public Switched Telephone Network) interconnection, and security interfaces necessary to implement a single-zone PacketCable solution for residential Internet Protocol (IP) voice services. "Single-zone" here refers to a system serving a single HFC cable plant or region.

| PacketCable 1.0 Specifications & Technical Reports | Specification Number |
|---|---|
| PacketCable ™ Audio/Video CODEC Specification | PKT-SP-CODEC-I03-011221 |
| PacketCable ™ Dynamic Quality-of-Service Specification | PKT-SP-DQOS-I03-020116 |
| PacketCable ™ Network-Based Call Signaling Protocol Specification | PKT-SP-EC-MGCP-I04-011221 |
| PacketCable ™ Event Message Specification | PKT-EM-I03-011221 |
| PacketCable ™ Internet Signaling Transport Protocol (ISTP) Specification | PKT-SP-ISTP-I02-011221 |
| PacketCable ™ MIBs Framework Specification | PKT-SP-MIBS-I03-020116 |
| PacketCable ™ MTA MIB Specification | PKT-SP-MTB-MTA-I03-020116 |
| PacketCable ™ Signaling MIB Specification | PKT-SP-MIB-SIG-I03-011221 |
| PacketCable ™ MTA Device Provisioning Specification | PKT-SP-PROV-I03-011221 |
| PacketCable ™ Security Specification | PKT-SP-SEC-I05-020116 |
| PacketCable ™ PSTN Gateway Call Signaling Protocol Specification | PKT-SP-TGCP-I02-011221 |
| PacketCable ™ NCS Basic Packages Technical Report | PKT-TR-MGCP-PKG-V01-020315 |
| PacketCable ™ Architecture Call Flows Technical Report - On-Net MTA to On-Net MTA | PKT-TR-CF-ON-ON-V01-991201 |
| PacketCable ™ Architecture Call Flows Technical Report - On-Net MTA to PSTN Telephone | PKT-TR-CF-ON-PSTN-V01-991201 |
| PacketCable ™ Architecture Call Flows Technical Report - PSTN Telephone to On-Net MTA | PKT-TR-CF-PSTN-ON-V01-991201 |
| PacketCable ™ 1.0 Architecture Framework Technical Report | PKT-TR-ARCH-V01-991201 |
| PacketCable ™ OSS Overview Technical Report | PKT-TR-OSS-V02-991201 | http://www.packetcable.com/specifications.html

The names and numbers of these specifications are reproduced in the following tables. These specifications are incorporated herein by reference in their entireties for their descriptive and reference material on the state of the art in VoIP over cable.

Note that Engineering Change Notices (ECNs) have been approved for several of the PacketCable interim specifications and these ECNs are considered part of the PacketCable PacketCable 1.1

The five specifications and four technical reports in the following table define requirements for offering a Primary Line-capable service using the PacketCable architecture. The designation of a communications service as "primary" means that the service is sufficiently reliable to meet an assumed consumer expectation of essentially constant availability. This also includes, specifically, availability during power failure at the customer's premises and (assuming the service is used to connect to the PSTN) access to emergency services (E911, etc.).

| PacketCable 1.1 Specifications & Technical Reports | Specification Number |
|---|---|
| PacketCable ™ Management Event MIB Specification | PKT-SP-EVEMIB-I01-020315 |

-continued

| PacketCable 1.1 Specifications & Technical Reports | Specification Number |
| --- | --- |
| PacketCable ™ Embedded MTA Primary Line Support Specification | PKT-SP-EMTA-PRIMARY-I01-001128 |
| PacketCable ™ Management Event Mechanism | PKT-SP-MEM-I01-001128 |
| PacketCable ™ Electronic Surveillance Specification | PKT-SP-ESP-I01-991229 |
| PacketCable ™ Audio Server Protocol Specification | PKT-SP-ASP-I02-010620 |
| PacketCable ™ Line Control Signaling System Architecture Technical Report | PKT-TR-ARCH-LCS-V01-010730 |
| PacketCable ™ Management Event Identifiers Technical Report | PKT-TR-MEMEVENT-ID-V01-001128 |
| VoIP Availability and Reliability Model for the PacketCable ™ Architecture Technical Report | PKT-TR-VOIPAR-V01-001128 |
| PacketCable ™ Electronic Surveillance Call Flows Technical Report | PKT-TR-ESCF-V01-991229 |

PacketCable 1.2

The two specifications and one technical report in the following table define the functional components and interfaces necessary to allow communication between PacketCable 1.0 networks using an IP transport or backbone network. These specifications describe the call signaling and Quality of Service (QoS) extensions to the PacketCable 1.0 architecture to enable cable operators to directly exchange session traffic. This will allow a subscriber on one PacketCable network to establish end-to-end IP or "on-net" sessions with subscribers on other PacketCable networks. For PacketCable, "on-net" means that the call is established end-to-end on the IP network without traversing the PSTN network at any time.

| PacketCable 1.2 Specifications & Technical Reports | Specification Number |
| --- | --- |
| PacketCable ™ Call Management Server Signaling Specification | PKT-SP-CMSS-I01-001128 |
| PacketCable ™ Interdomain Quality of Service Specification | PKT-SP-IQOS-I01-001128 |
| PacketCable ™ 1.2 Architecture Framework Technical Report | PKT-TR-ARCH1.2-V01-001229 |

What is needed is a secure media processing and switching system that is compatible with the PacketCable specifications (so that it can serve cable systems) and is resistant to theft and Denial of Service attacks while supporting CALEA, E911, and toll quality of service requirements. This system must interface with existing PSTN gateway systems, cable headend, and HFC plant equipment. Furthermore, such a system must be integrated under a single EMS, fault-resilient, robust, scaleable, and ultimately cost effective in order to overcome the known shortcomings in the present state of the art.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Secure Media Processing Architectural Framework

Presently disclosed is a new category of voice switching, integrated with multimedia (video, audio, graphic, and text content), that provides a versatile and secure media switching system for use in the cable headend or any other data switching center or node. This Secure Media Processing (SMP) system provides telephony services to cable subscribers, in addition to standard cable television and multimedia (e.g., video, audio, etc.) distribution and services.

The SMP system integrates into one system the Call Management Server, Packet Switch, Media Gateway, Signaling Gateway, Media Gateway Control, and traffic bearing interface functions of the PacketCable reference architecture described above. The SMP architecture takes a fresh look at the functions specified in the PacketCable reference model and presents a single, fault-resilient, logical interface for cable telephony services as a highly integrated, secure, and reliable delivery scheme for Voice over IP (VoIP) telephony services.

Figure 1:
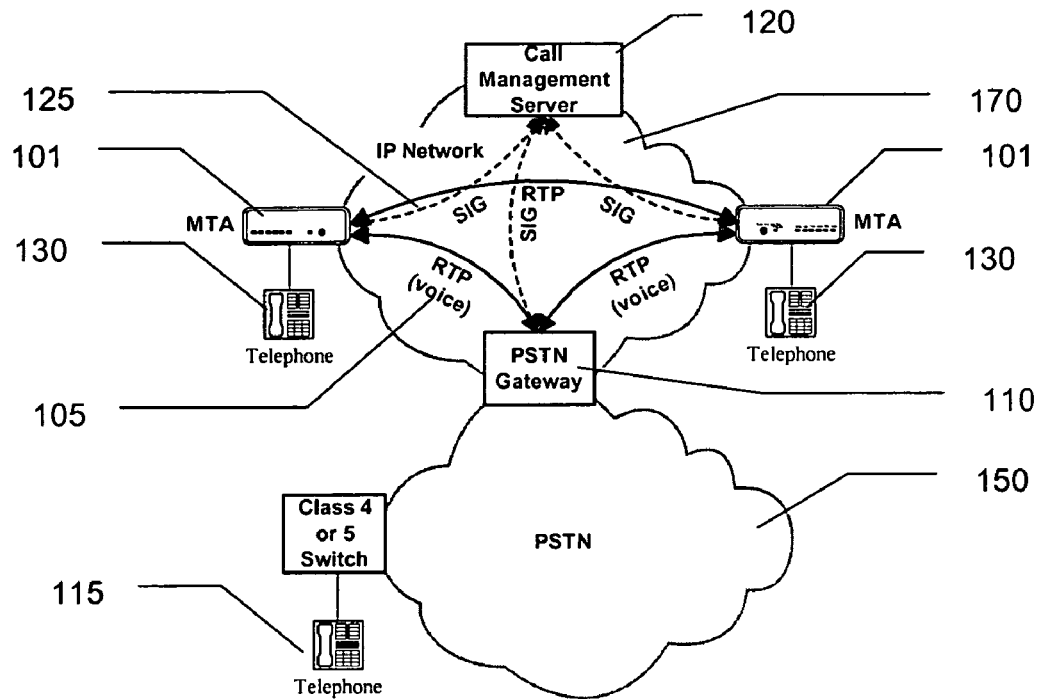
FIG. 1 is a high-level block diagram of a prior art VoIP softswitch architecture.

In prior art distributed telephony systems, such as that depicted in FIG. 1, a Call Management Server 120 responds to the MTAs 101 that will be involved in the call by providing to each MTA the other MTA's IP address. The IP network can thus route calls between MTAs based on traditional routing methods, path availability, cost, levels of congestion, number of hops, and others aspects of traffic and routing engineering. This approach, although effective for data communications, proves to be non-causal and non-deterministic for time-sensitive services like voice, where path latency, quality, privacy, and security need to be tightly controlled. Also, because the IP address of the MTAs involved in the call is attached to all packets that are transmitted, privacy and security for all participants in the services delivered by the network is not assured.

By contrast, the SMP architecture, in some embodiments, is able to provision each MTA to send its traffic directly to the packet switch interface and not to other MTAs. This prevents the MTA from getting any other MTA's IP address. It also has the advantage of presenting a single, fault-tolerant, logical interface to all MTAs. And, because the path is deterministic, it allows for controlling the latency and the quality of the path to the switch. Most importantly, the SMP architecture provides protection for the privacy of the individuals involved in the call.

The SMP architecture also provides particular benefits in the areas of user privacy, support of Communications Assistance for Law Enforcement Act (CALEA) legal wire-tapping, Emergency 911 (E911), and Operator Interrupt of an in-progress call. In addition, it positively impacts fundamental network needs and requirements like scalability, security and privacy, availability, operations, network simplification, and cost.

In "Primary Line" services, those designed to be the customer's main or sole voice link, regulatory specifications mandate the implementation of features like CALEA, E911, and Operator Interrupt. The challenge in creating distributed telephony systems for primary line use resides in the compliance with CALEA, E911, and Operator Interrupt, as well with ensuring the availability and data security that customers have come to expect. In prior art distributed systems, every element involved in the processing, switching, and signaling of the call is required to support these features. This creates duplication of functions like decryption and bridging points for CALEA and Operator Interrupt, as well as the need to coordinate these features among multiple elements in the network. As the number of components increases in the network, so does the number of possible failure points, hence reducing the overall availability figures of the network. This increases complexity and duplication of functionality, which increases the overall cost of the network. For E911 calls, the complexity of the distributed architecture further requires that all elements (and their Element Management Systems) operate in concert to support the bandwidth management and QoS requirements that allows these calls through during high network use every time.

Further compounding the problems of distributed switching approaches, when network functions are decoupled from each, the network needs to rely on signaling protocols to logically tie or integrate its various elements together, in order to operate as an integrated network segment. This decoupling fuels the proliferation of signaling protocols, data path links, mixed control and customer traffic, and multiple Element Management Systems. And for each link, protocol, and EMS added to the mix of elements, another potential point of failure surfaces. Given that overall network availability and reliability is a product of the reliability of each of its elements, this proliferation drastically increases the requirements for resiliency, reliability, and availability on every element in the network. It is thus very difficult, if not impossible, to reach the industry's desired level of availability using the distributed "softswitch" approach, as such systems are often described in the art.

The SMP architecture addresses these shortcomings in the prior art by providing a single, highly integrated, secure, and reliable delivery point for multimedia services/data in a single network elements with a single EMS. The control data traffic is immediately separated from the customer (payload) data traffic to increase network control integrity independent of customer traffic conditions. By reducing the number of elements in the network, links are reduced, points of failure are reduced, and overall network reliability is increased. In addition, the level of integration provided by the SMP architecture allows for the efficient implementation of high-availability, fault-resilient methods of call-control, path restoration, and service delivery that would be impossible to apply across the multiple platforms used in prior art distributed approaches. The SMP architecture's high level of integration also allows a natural policing function, with a single processor implementation for all the functions needed to service a call from initiation to termination of the call, including restoration, switching, and routing, thus protecting from errant processes that could decrease system or network availability.

To further insure availability and scalability requirements, the SMP architecture allows for sophisticated bandwidth management methods for the various types of media data and services it provides. These bandwidth management methods provide deterministic call acceptance control functions for the system, allowing individual call requests to be accepted or rejected based on call load, type and subscription policy.

The SMP architecture's bandwidth management capabilities span four of the traditional functional resource elements: Access Networking, Switching, Media Gateway, and Trunking. In typical prior art distributed systems, each functional resource element would be controlled and monitored by a separate (and oft-times incompatible and/or proprietary) EMS. The SMP architecture, by contrast, provides the unified resource management necessary to provide a telephony and general media processing solution that is consistent with the scalability, availability, and resiliency of today's PSTN, yet available for use with all types of multimedia data rather than purely voice or video data.

The SMP architecture eliminates the complexity of multiple prior-art, proprietary Element Management Systems with an integrated solution using a single Element Management System (EMS) for operation and control. The increase in reliability and availability accomplished by this level of integration allows the platform to offer E911, CALEA, and Operator Interrupt services consistent with PacketCable and other relevant specifications. SMP provides a single point for decryption and bridging for CALEA support and for operator call interrupt. SMP also allows for the implementation of bandwidth management methods to facilitate E911 calls.

EXEMPLARY EMBODIMENT

Figure 2:
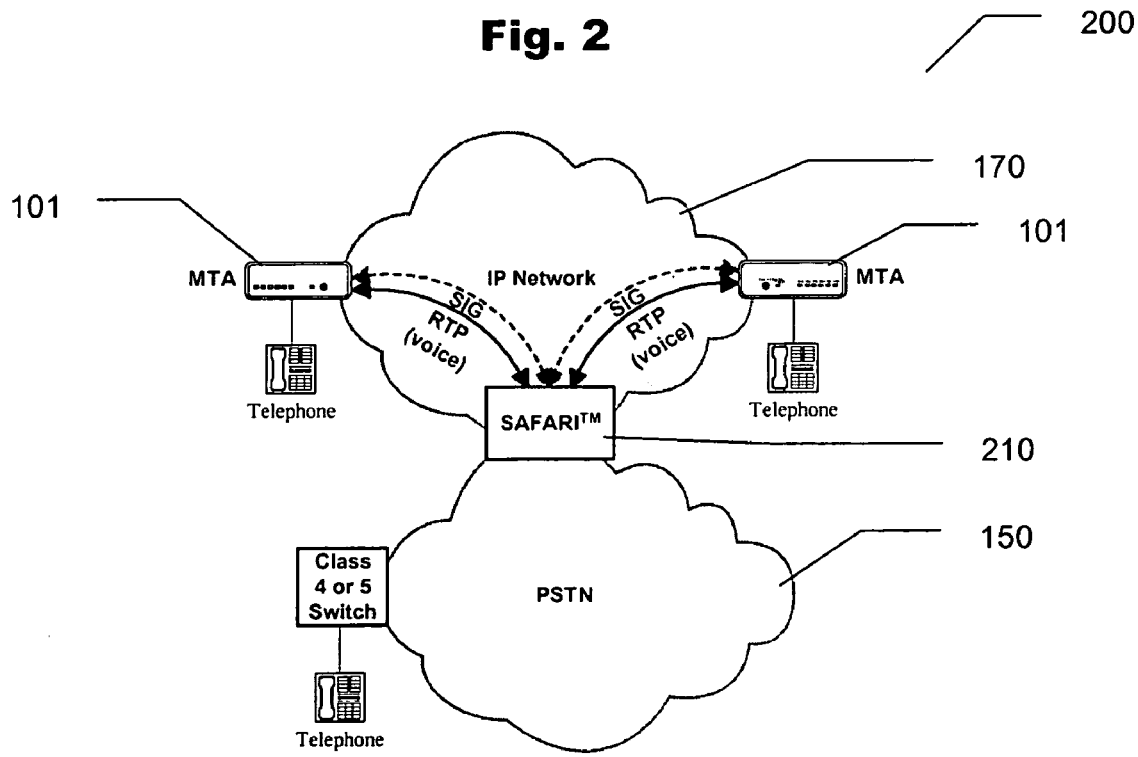
FIG. 2 is a high-level block diagram of the VoIP architecture according to one embodiment of the present invention.

FIG. 2 illustrates one exemplary embodiment of an SMP architectural framework 200. As noted above, the SMP architecture provides network privacy to VoIP telephony subscribers while allowing the service provider a more cost effective method to meet the requirements set forth by CALEA and other telephony/media services. The SMP architecture utilizes a trusted routing function and is, in one implementation, embodied in Cedar Point Communications' SAFARI™ Cable Media Switch. The SMP trusted routing function eliminates all MTA-to-MTA RTP flows in the IP network and provides the functions of a PSTN Gateway, a Call Agent (or "softswitch"), and Class 5 (i.e., a local office, non-tandem) switch by integrating Signaling System 7 (SS7) telephone signaling and voice calls with packet network data.

In one exemplary embodiment, the SAFARI implementation provide a small, single-shelf, standard rack-mount chassis, thus having only a very small footprint in the cable headend or central office. All hardware and software are fully integrated in the chassis (and its associated EMS workstation), providing highly space and power-efficient operations.

In the SMP architecture, MTAs 101 are only provided the IP address of the SMP switch 210 so that the IP addresses of all other MTAs are kept private. By instructing the MTAs 101 to route all RTP data units (or streams) to the switch 210, Operator Interrupt, CALEA conformance, and ensured Quality of Service (QoS) provisioning is also simplified.

Figure 3:
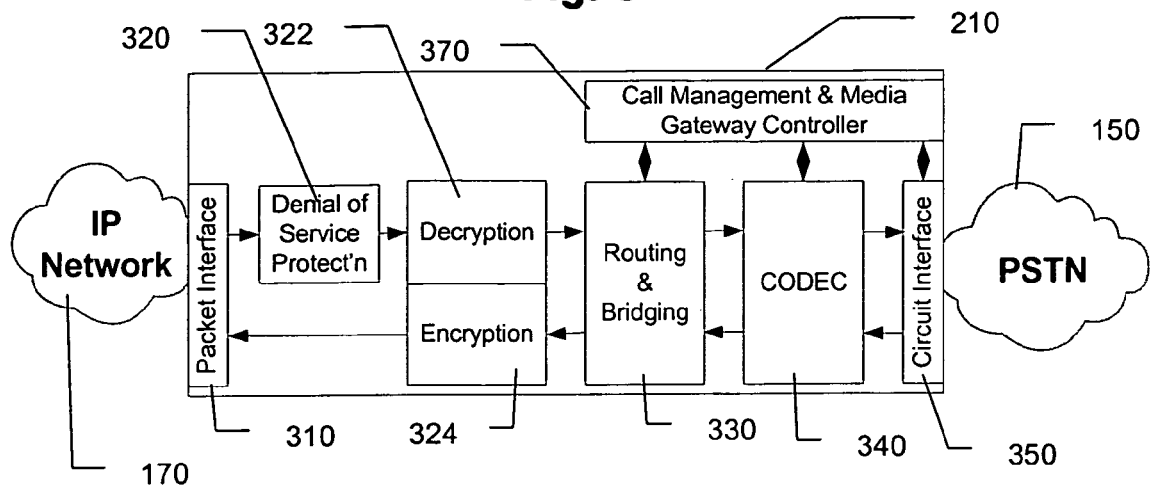
FIG. 3 is a functional block diagram according to one embodiment of the present invention.

The SMP switch 210 also includes interfaces to the IP 170 and PSTN Networks 150, Denial of Service (DoS) attack protection, encryption and decryption, routing and bridging, and TDM Coding/Decoding (CODEC) functions, as shown in FIG. 3.

RTP data units, conventionally referred to as "packets," originating from any MTA in the IP network are first received at an ingress port (not shown), processed by the Packet Interface 310, and sent to the Denial of Service Protection block 320. The DoS protection block keeps Denial of Service attacks from reaching and degrading subsequent packet processing. Packets are then decrypted to meet the security requirements of the IP network and sent to the Routing & Bridging block 330.

Note that the "processing" referred to above includes reformatting the RTP data unit streams into special encapsulated packet streams for use internal to the switch 210. These encapsulated packets (discussed further below) are optimized for efficient transport and receipt at the egress ports.

The Routing & Bridging block 330 applies the appropriate routing and/or bridging function based on the destination and services specified for the call to determine which egress port to send the data units out on. Packets can be rerouted (directed) back to the IP network 170, in which case they will be encrypted 324 and processed by the Packet Interface 310, or sent to the CODEC block 340.

The CODEC block performs standard coding and decoding functions such as those described in ITU Specifications G.711, G.729, G.168, and/or N-way bridging.

The Circuit Interface 350 provides a standard DS0 circuit interface to the PSTN; likewise, the Call Management and Media Gateway Controller 370 performs typical functions defined for VoIP telephony and currently practiced in the art. Arranging these functions as illustrated protects IP network users and services from malicious attack and provides a unique solution for providing carrier grade telephony and CALEA monitoring services in a VoIP network.

In one embodiment, internal communications and switching functions within the SAFARI switch are implemented using direct fiber optic connections through a fiber optic backplane equipped with Cedar Point Inc.'s proprietary removable optical backplane connectors. The removable backplane connector is further described in U.S. patent application Ser. No. 09/938,228, filed on Aug. 23, 2001, incorporated herein by reference in its entirety.

The major functional blocks in the SMP architecture, are described in further detail below.

VoIP Telephony Subscriber Privacy

When a subscriber initiates a phone call to another subscriber within a traditional VoIP network, the IP addresses of the originating and terminating MTAs are exchanged within the Session Description Protocol (SDP) (See IETF RFC 2327). The SDP is encapsulated within a well-known signaling protocol such as those described in ITU standards H.323, SIP, MGCP, or MEGACO (depending on the standards and equipment used by the service provider). Cable providers, for example, have standardized on an MGCP profile referred to as the Network-based Call Signaling (NCS) protocol. See, for example, PacketCable Specification PKT-SP-EC-MGCP-I02-991201, incorporated herein by reference in its entirety, for a complete description of this protocol.

In the SMP architecture, the Call Management function inserts its own IP address in the SDP profile exchanged between MTAs instead of the IP addresses of the other MTA. This keeps proprietary MTA IP address information local to the SMP switch, which is necessarily a trusted network element, instead of sending it to each MTA involved in a phone call. To create the voice path, each MTA establishes a RTP packet flow to the SMP switch; the SMP then routes the packet flow appropriately, i.e., to another MTA for a call within the VoIP network or (after conversion to the appropriate and well-known format for routing) to the PSTN.

Operator Interrupt & CALEA Compliance Features

Telephony features such as busy line verify, Operator Interrupt (break-in), and CALEA have similar requirements for monitoring or tapping into a voice call. In the traditional VoIP architecture, MTAs, the PSTN Gateway, and other routing equipment all require extra functionality and interaction to comply with these features. In the SMP architectural framework, the required functionality is isolated to the local Routing and Bridging function within the switch itself. This function provides the ability to unobtrusively listen or conference to a telephone call carried on an encrypted RTP packet flow and connect it to a standard No-Test or Busy Line Verification (BLV) trunk (for operator break-in) or a Call Content Channel (for CALEA monitoring).

Packet Encapsulation

The SMP architecture, in some embodiments, may also utilize a low-latency, low-overhead, bandwidth-efficient method for DS0 circuit encapsulation designed to carry circuit traffic as efficiently as packet traffic. This DS0 circuit encapsulation method may be easily configured to accommodate any mix of data units, packets, and VoIP traffic. In particular, it provides a method for encapsulating circuit traffic (i.e., RTP data units) for low-overhead packet data unit switching through a fabric so that the specific delay requirements of voice and other latency-intolerant circuit traffic are met.

Figure 4A:
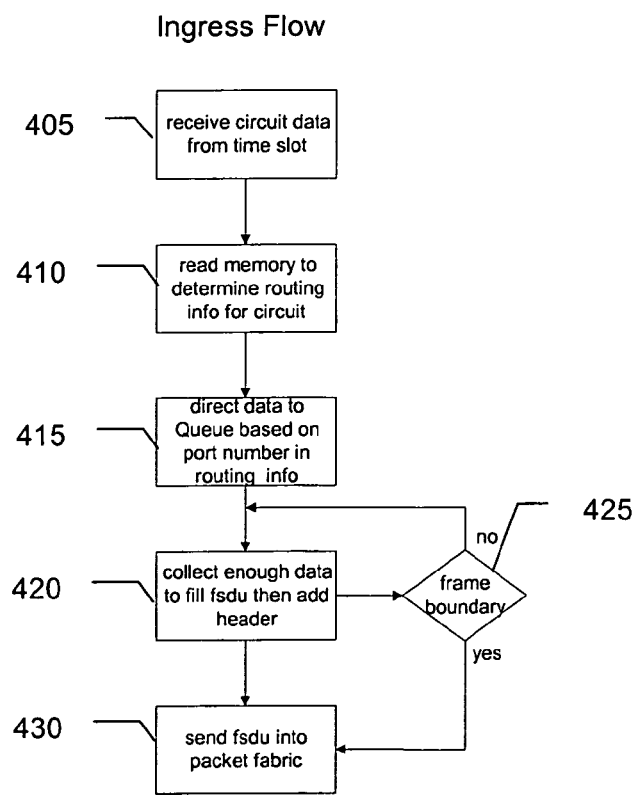
FIGS. 4A and 4B are flowcharts of the packet encapsulation process according to one embodiment of the present invention.

The encapsulation process is illustrated in FIG. 4. Here, the Ingress flow (whose processing is shown in FIG. 4A) is a data stream coming into the switch from the circuit network, i.e., the PSTN. The Egress flow (shown in FIG. 4A) is the data stream leaving the switch and entering the PSTN in a TDM time slot.

For an ingress flow, shown in FIG. 4A, processing begins when the circuit data unit is received (read) during the selected TDM time slot, step 405. The process then checks memory to determine the routing information corresponding to the received data unit, step 410. The data unit is directed to a particular queue based on the egress port number derived, at least in part, from the routing information, step 415.

Step 420 continues the process of steps 405 through 415 until enough data units are collected to fill the FSDU by testing for a frame boundary, 425, after each addition to the queue. Once the FSDU is filled, a header is added to the FSDU, creating the encapsulated packet. The encapsulated data packet is then sent into the switch fabric and directed to the proper egress queue, in step 430. The process repeats at step 405 as long as there is data present at the ingress port.

Figure 4B:
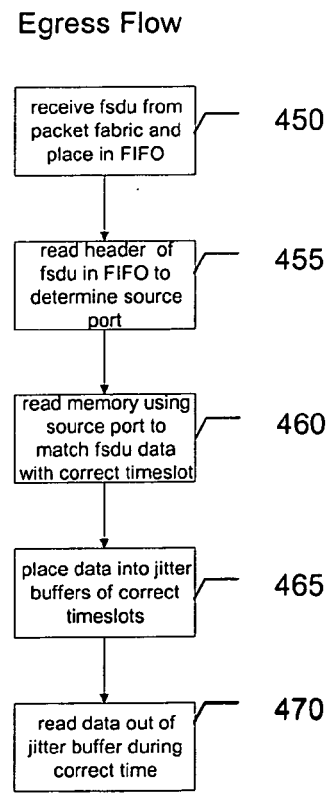

The egress flow process, depicted in one embodiment, in FIG. 4B, is similar. In step 450, the encapsulated data packet is received from the switching fabric and placed in a FIFO buffer. The header is read, step 455, and the source port is determined from the information stored in the header. The source port identifier is used to read the memory location corresponding to this FSDU to determine the correct timeslot for each data unit in the FSDU in step 460. The data units in the FSDU are then unpacked (i.e., re-formatted) and placed into jitter buffers corresponding to the destination timeslot for each data unit, step 465.

When the correct timeslot time arrives, the data units are read out of each jitter buffer and transmitted into the TDM stream.

An exemplary embodiment of the SMP architecture (exemplified by, but not limited to, the Cedar Point SAFARI media switch), is used to switch both packet traffic and TDM-based DS0 traffic simultaneously using the same fabric. A packet switch (by definition) is designed to handle the specific requirements of packet traffic, and the present system may provide conventional packet switching functionality as described elsewhere in this disclosure.

Figure 5:
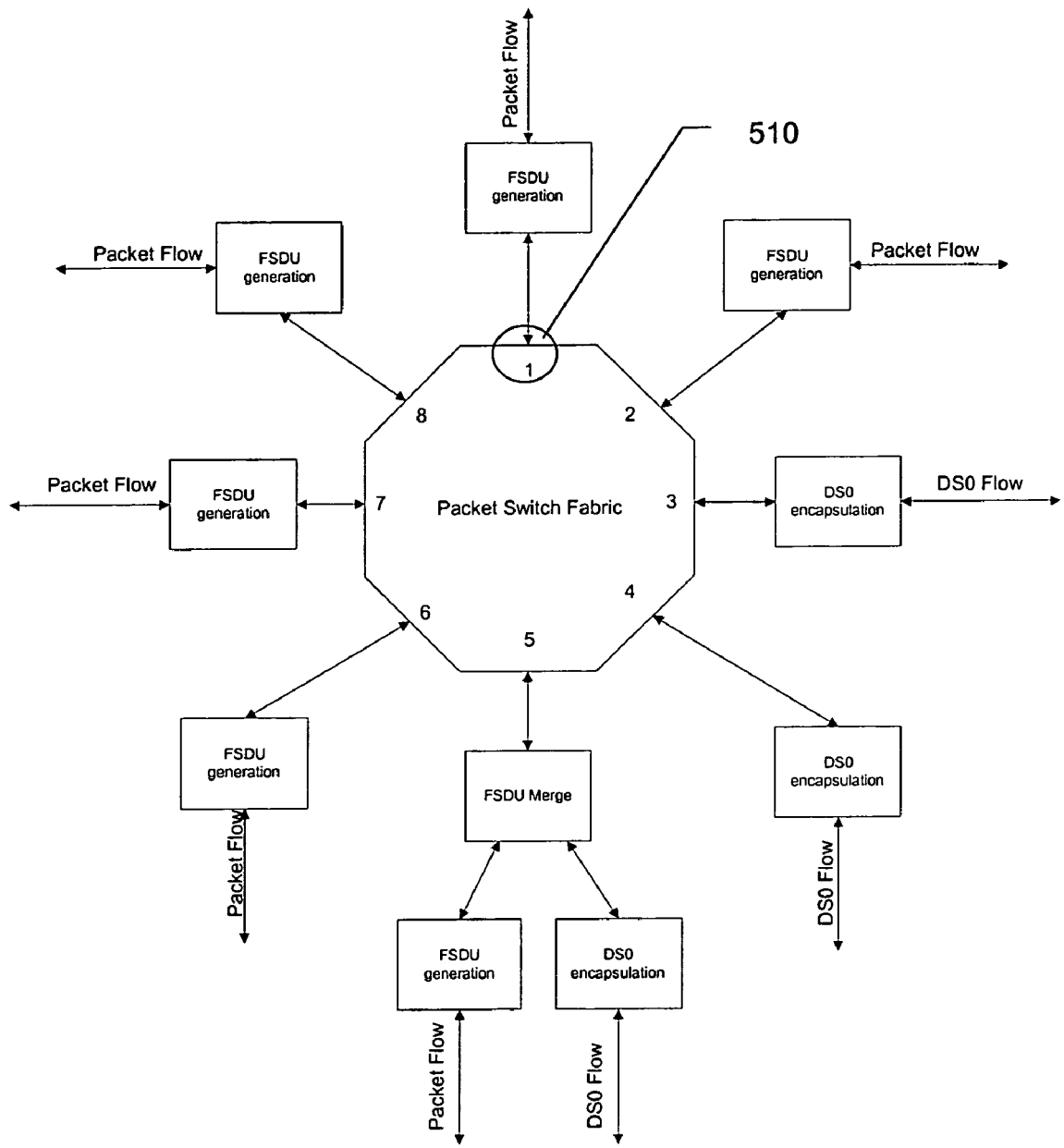
FIG. 5 is a high-level block diagram of a switch fabric architecture of an exemplary embodiment of the present invention.

A packet switch fabric 500 has a finite number of high-speed ports 510 (eight, for example), as shown in FIG. 5, although any number can be used in practice. This implies that there may be eight ingress (input) ports and eight egress (output) ports to the switch fabric. In each cycle time, the eight inputs are connected in some fashion to the eight outputs to create up to eight connections. During this cycle time, one and only one FSDU may be passed on each connection. Depending on traffic behavior, not every input may be able to connect to the output required for the FSDU it has to send (i.e., contention may arise). In this situation, it may take several cycle times for all eight inputs to send one FSDU. If all inputs wish to send their FSDU to the same output, it will take eight cycle times for all the FSDUs to be sent.

Switch traffic may consist of any arbitrary mix of packet traffic and DS0 traffic on the different ports. Some ports may be dedicated to packet traffic (e.g., port 1 in FIG. 5), some ports may be dedicated to DS0 traffic (e.g., port 3), and some ports may support a combination of traffic types (e.g., port 5). The SMP architecture allows for any combination of traffic types without affecting the performance characteristics required by the applications. Furthermore, the system is transparent to the actual information represented by the packet or TDM (DS0) data flows. Voice signals, data, FAX or modem signals, video, graphics, or any other information can be carried and switched with equal ease and facility by and within the SMP architecture described herein.

A DS0 TDM circuit carries a single byte of data every 125 usec. This time interval is more commonly referred to as a frame in the telecommunications arts. Since the packet fabric has an FSDU of between 64 bytes and 256 bytes, a single DS0 TDM circuit does not come close to filling an FSDU. The remaining space in the FSDU would be wasted by filling it with padding if an individual DS0 circuit was dedicated to a single FSDU. Thus, it would be very inefficient to map a single byte of data into such a large FSDU.

One option is to wait a longer period of time in order to accumulate a larger number of bytes for the DS0 circuit. In order to fill a 64 byte FSDU, one would have to wait 8 msec, or 32 msec for a 256 byte FSDU. With voice calls, this represents a significant delay for the circuit and does not meet typical "toll" Quality of Service network switching requirements. It also requires a much larger amount of memory to handle the temporary storage of this data. Neither one of these options is ideal.

Figure 6:
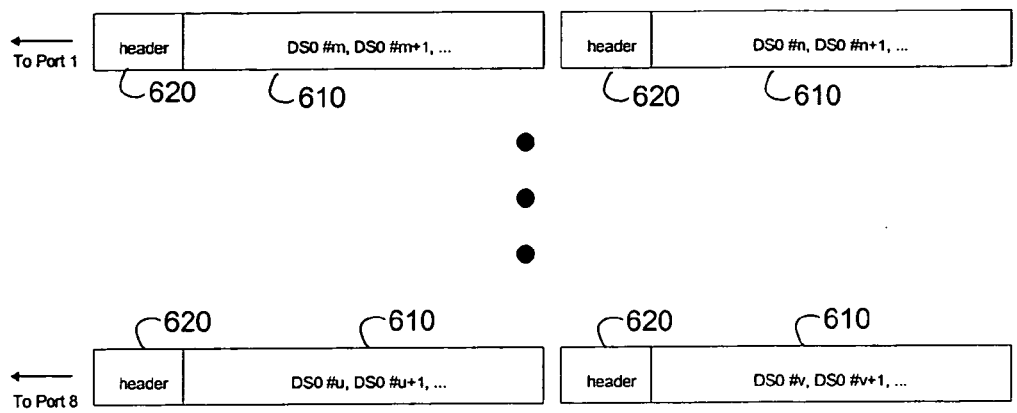
FIG. 6 is a schematic representation of the TDM data format employed in some embodiments or the present invention.

According to some embodiments of the present disclosure, multiple DS0 TDM circuits are combined within each frame time to more completely fill an FSDU 610. This combination is illustrated in FIG. 6. Since there is a fixed and manageable number of switch fabric ports, it is reasonable to fill FSDUs 610 with multiple DS0 circuits destined for the same switch fabric output port.

This a dynamic process: as DS0 circuits destined for a particular switch fabric come and go, the process dynamically adds and drops DS0 circuits to efficiently fill the FSDU 610 destined for each port. If a circuit is dropped, all circuits that are still active will slide to fill in the hole left by the dropped circuit.

For each of the eight switch fabric ports (in some embodiments), a separate circuit 520 (referring to FIG. 5) is used to generate FSDUs for traffic headed for that port. A header 620 at the beginning of each FSDU identifies the switch fabric port along with priority information to guide the FSDU properly through the switch fabric. The rest of the FSDU is filled with TDM data. For example, if a 64 byte FSDU contains 2 bytes of overhead, the remainder of the FSDU can be filled with 62 DS0 TDM channels. Within each frame, as a single byte of data from each circuit is received on the device, it is added to the FSDU for the particular destination port to which it should be sent. When an FSDU is full, it is sent to the packet switch and another FSDU is started for that port. All FSDUs must be sent by the end of the frame, even if they are not completely filled, in order to keep the delay of the method to 125 usec. Using this scheme, the data is filled efficiently in the FSDUs with 62/64 or 96.9% efficiency per FSDU except for at most 16 FSDUs that may be only partially filled. With a 256 byte FSDU, this efficiency rises to 254/256 or 99.2% per FSDU. If the switch can handle 16,000 circuits, the 64 byte FSDU has an overall efficiency of 91.2% and the 256 byte FSDU has an overall efficiency of 93.4%. In comparison, putting a single DS0 TDM channel into an FSDU has an efficiency of only 1.6%.

On the output (egress) side of the switch fabric, the FSDUs are processed (reformatted) to remove the headers and pull out the individual DS0 channels. The routing information for each channel can be made available to the processing device at the output of the switch fabric through different methods that are well-known in the switching and routing arts. The DS0s are then put back into a TDM format again for transmission through the egress ports and into the network.

In conjunction with the method for packing the FSDUs as described above, since the DS0 data is very time sensitive, it must be passed through the switch fabric with a guaranteed maximum latency. As mentioned above, the switch fabric is shared with packet traffic that can exhibit bursty arrival behavior. To prevent packet traffic from competing with the high priority TDM traffic, the TDM-based FSDUs are assigned a priority level that is higher than that of the packet traffic. Provided the bandwidth allocated for the particular priority level assigned to TDM traffic is not exceeded, the amount of TDM traffic is deterministic, and the latency for TDM traffic through the switch fabric can be guaranteed independent of the quantity of packet traffic. The effect of this method is such that the circuit and packet traffic can be mixed in any combination through the switch fabric with neither type of traffic impacting the performance of the other.

Since the latency can be bounded, it is now possible to reconstruct the TDM stream on the output side of the switch fabric and align the individual data streams into the correct time slot assignment. In order to accomplish this, a jitter buffer is necessary to smooth out the variable delays encountered by going through the packet switch. Since low latency is important, it is necessary to size the jitter buffer as small as possible; however, the jitter buffer must be sized large enough to account for the minimum and maximum latencies through the switching fabric. Using commercially available packet switch fabrics, it is reasonable to constrain the jitter buffer to introduce an additional delay of no more than a single frame time of 125 microseconds.

This SMP architecture's switch fabric implementation thus produces a single switch fabric with the latency and throughput performance equivalent to having separate dedicated TDM and packet switches. It accomplishes this without the expense of multiple fabrics or the complexity of interconnecting them.

Denial of Service (DoS) Attack Survivability

Physical security, firewalls, specific filters, or session level user authentication or encryption (alone or in combination) represent the primary tools for providing network security known in the art today. The first two mechanisms, physical security and firewalls, provide boundaries that attempt to partition the global Internet into domains with limited user or service access. The third and fourth methods also provide a logical partitioning but on a finely granular basis (e.g., based on having a validated user).

There are both advantages and disadvantages to these types of partitioning or boundary strategies. One advantage could be that a corporation may have only one access point to the global Internet and so only one firewall need be established and administered. (This is becoming less and less common as the demand for resources and services found on the Internet has lead to increased demand on bandwidth and availability of Internet access). A disadvantage that is shared by all of these partitioning methods, however, is that once the boundary is circumvented or penetrated, the attacker now appears as a valid user inside the penetrated network.

It is in these circumstances that most Denial of Service (DoS) attacks are initiated: an unauthorized user who has penetrated or circumvented the security methods of a corporation or service provider appears as a valid user on the network. The internal network behind the firewall is typically defenseless because it has no methods to detect or limit a Denial of Service attack once it has been initiated.

In general, Denial of Service attacks are directed against the control and management functions (i.e., the "control plane," as it is known in the art) of routers and hosts in the "infected" network. DoS attacks either generate packets at very high rates, which when directed at hosts and routers will generate equally high error responses, or they generate packets that have exponential error message responses. The effect the attacker is looking for is either to saturate the networks themselves with storms of useless packets or saturate the application computing power of the routers or hosts making them unable to carryout their normal activities. In either case, the attacker has denied service to other, legitimate users of the system.

An important objective of the SMP architecture's network security functionality is its ability to withstand Denial of Service (DoS) attacks from malicious use of Customer Premises Equipment (CPE). Tampering with CPE can allow an unauthorized user (e.g., a cracker or hacker) to interrupt, steal, or deny service to authorized users in the network and potentially render the network unavailable. Protection against these attacks is essential in any network and even more critical when the network is delivering primary line telephony services. In the prior art, this problem has been shown to be even more acute in the distributed softswitch approach, where control information traverses the network along with the data payload. This situation, known as in-band signaling, allows sophisticated hackers the ability to simulate or flood control information, potentially rendering the network or its key elements useless.

In order to counter the DoS threat, the integrated SMP architecture provides a physically closed environment between the data payload and control planes, i.e., complete separation between control and data payload signals. In addition, the SMP architecture routes all calls from the MTAs through its packet-processing interface, where they are passed through Denial of Service protection algorithms before further processing.

The DoS protection algorithms and procedures detect and limit the effect of many Denial of Service attacks in real time while also alarming the event to the network monitoring agents for further action. This may be implemented in either a centralized (e.g., in the SAFARI media switch) or with a distributed approach; the effect of applying these algorithms to some of the elements (as opposed to all) will still have significant positive effect in reducing the damage inflicted by a given Denial of Service attack.

The DoS protection algorithms serve as a first line of defense from Denial of Service attacks by blocking attacks from propagating deeper into the network. The DoS protection "pre-processing" algorithms may include detection, isolation, tracing, and reporting of the attack to allow operators to manage the attack. Attack management is used to allow the network to operate as intended and thus continue to generate revenues. With this integrated system, special methods and systems (described below) can be implemented for detecting, alarming, and protecting from hacker attacks, which enter the network.

DoS survivability and protection may be provided, in some embodiments of the invention, by classifying packet flows for all valid applications with a classified host-flow isolation scheme. Buffering and queuing are first performed at the interface level. Next, a weighted class-based queuing (CBQ) scheduler applies size limits to each and every queue, based on the application type servicing each queue. A session manager administers the flow of the packets from the queues to the application layer and keeps track of the status of each application.

When presented with an attack, errors will be reported by the application layer to the session manager. The session manager then throttles back the affected queue, alarming the condition to the EMS when a programmable threshold level has been reached, and trigger a trace and record function on the misbehaving packets. Additionally, the SMP architecture allows the user to install custom or special-purpose filters designed to prevent new and different attacks.

The specific operation of the DoS protection algorithms is as follows. First, highly granular flow classifications are provided for all valid Internet applications on the system. Associated with each flow are a queue and a dedicated pool of buffers. These queues and buffer pools are further subdivided by interface so that the effect is to have a dedicated queue and pool of buffers on a per-application, per-interface basis. A weighted, class-based queuing (CBQ) scheduler drains each queue with a fixed (but programmable) service size, based on the application type. Thus, as a Denial of Service attack is launched against the SMP, the effect will be limited to the single application type and interface at which the Denial of Service attack was directed.

Above the queue scheduler (functionally) is a session manager which interacts with each application. The session manager passes packets along to the application, maintaining a buffer pool credit balance as packets are consumed and keeping track of the application status on each packet transmitted. Since most Denial of Service attacks are designed to generate malformed or incomplete application service requests, they generate some form of error. As the frequency of these errors increase, the duty cycle (i.e., the queue service size) on that application queue will be decreased. At a certain threshold, the queue's reduced service size generates an alarm to the (pre-programmed) network operator via the EMS. The EMS or operator can than effect countermeasures or the type well-known in the art. This feedback mechanism has the effect of dampening the DoS attack's severity.

When the alarm event is triggered, a trace mechanism is invoked which records a fixed number of the offending packets for future analysis. In addition, the network operator has the option of installing a filter (via the EMS) on the incoming interface which will filter all packets from the source of this Denial of Service attack.

Taken together, these mechanisms provide a powerful and flexible real-time response to Denial of Service attacks, ensuring that their effect is minimized and the network operator promptly notified.

ALTERNATE EMBODIMENTS

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, microcode, interpreted code, etc.) stored in any computer-readable medium (e.g., ROM, RAM, flash memory, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of media data switching, comprising:
   receiving a plurality of media data units at an ingress port;
   determining a corresponding egress port for each of said plurality of media data units based on the type of each said media data unit;
   reformatting one or more said media data unit into an encapsulated packet;
   directing each said encapsulated packet toward said corresponding egress port based in part on said reformatting;
   reformatting said encapsulated packets into a second plurality of media data units at each said egress port;
   switching media data by transmitting said second plurality of media data units; and
   controlling said media data switching through a single element management system.

2. The method of claim 1 wherein said media data units comprise audio data.

3. The method of claim 1, wherein said media data units comprise video data.

4. The method of claim 1, wherein said media data units comprise television signals in digital form.

5. The method of claim 1, wherein said determining further comprises securely processing said media data units.

6. The method of claim 5, wherein said securely processing further comprises concealing the IP addresses of the transmitting party from the receiving party and concealing the IP addresses of the receiving party from the transmitting party.

7. The method of claim 5, wherein said securely processing further comprises providing CALBA services undetectable to either the transmitting or receiving parties.

8. The method of claim 1, wherein said determining is based in part on the type of media data in each said media data unit.

9. The method of claim 1, wherein said determining further comprises queuing said media data units using high-granularity, class-based queues to provide protection from Denial of Service attacks.

10. The method of claim 9, wherein said queuing employs a plurality of queues for each class of service.

11. The method of claim 1, wherein said directing occurs in real-time.

12. A method of cable media switching, comprising:
    receiving data at an ingress port;
    reformatting said data into a plurality of encapsulated packets;
    switching said plurality of encapsulated packets to one or more egress ports, based in part on said reformatting;
    reformatting said encapsulated packets into second data; and
    switching cable media by transmitting said second data, wherein said cable media switching is performed under the control of a single element management system.

13. An apparatus for integrated media switching comprising:
    a plurality of ingress ports each receiving a plurality of media data units; a fiber optic backplane a processor connected, comprising means for:
    determining a corresponding egress port for each of said plurality of media data units based on the type of each said media data unit; and
    reformatting one or more said media data unit into an encapsulated packet;
    a plurality of egress ports, for reformatting said encapsulated packets into a second plurality of media data units and for
    transmitting said second plurality of media data units to perform said media switching, wherein said ingress ports, said processor, and said egress ports are operable connected to each other, and said ingress ports, said processor, said egress ports, and said backplane are controlled through a single element management system.

14. The apparatus of claim 13, wherein said ingress ports, said processor, said egress ports, and said backplane are provided in a single chassis.

15. The apparatus of claim 13, wherein said processor further comprises high-granularity, class-based queues of said media data units constituted to provide protection from Denial of Service attacks.

16. A computer system for use in media data switching, comprising computer instructions for:
    receiving a plurality of media data units at an ingress port;
    determining a corresponding egress port for each of said plurality of media data units based on the type of each said media data unit;
    reformatting one or more said media data unit into an encapsulated packet;
    directing each said encapsulated packet toward said corresponding egress port;
    at each said egress port, reformatting said encapsulated packets into a second plurality of media data units; and
    switching media data by transmitting said second plurality of media data units to perform media switching, wherein said ingress ports and said egress ports are controlled through a single element management system.

* * * * *

UNITED STATES PATENT AND TRADEMARK OFFICE
CERTIFICATE OF CORRECTION

| | | |
|---|---|---|
| PATENT NO. | : 7,450,614 B2 | Page 1 of 1 |
| APPLICATION NO. | : 11/410848 | |
| DATED | : November 11, 2008 | |
| INVENTOR(S) | : Devine et al. | |

It is certified that error appears in the above-identified patent and that said Letters Patent is hereby corrected as shown below:

In Claim 7, column 16, line 2, please replace "CALBA" with --CALEA--

Signed and Sealed this

Ninth Day of June, 2009

JOHN DOLL
*Acting Director of the United States Patent and Trademark Office*